United States Patent [19]

Fletcher et al.

[11] 4,035,062
[45] July 12, 1977

[54] METHOD AND APPARATUS FOR PRODUCING AN IMAGE FROM A TRANSPARENT OBJECT

[76] Inventors: James C. Fletcher, Administrator of the National Aeronautics and Space Administration, with respect to an invention of Sing H. Lee, Del Mar, Calif.; Arnold R. Shulman, Bethesda, Md.

[21] Appl. No.: 645,500

[22] Filed: Dec. 30, 1975

[51] Int. Cl.² .................. G02B 5/08; G02B 5/18
[52] U.S. Cl. .................. 350/162 SF; 350/202; 350/299
[58] Field of Search ............. 350/162.5 SF, 160 P, 350/163, 202, 299, 160 R; 356/112, 129; 307/88.3

[56] References Cited

U.S. PATENT DOCUMENTS

| | | | |
|---|---|---|---|
| 3,424,512 | 1/1969 | Ingalls | 356/112 X |
| 3,432,239 | 3/1969 | Holland | 356/112 |
| 3,516,727 | 6/1970 | Hickey et al. | 350/163 X |
| 3,531,204 | 9/1970 | Holland et al. | 356/112 |
| 3,586,444 | 6/1971 | Sproul et al. | 356/129 |
| 3,598,471 | 8/1971 | Baldwin et al. | 350/160 P X |
| 3,749,475 | 7/1973 | Shupe | 307/88.3 X |
| 3,778,635 | 12/1973 | Giuliani | 307/88.3 |
| 3,915,573 | 10/1975 | Knoll et al. | 356/112 |

OTHER PUBLICATIONS

"Mathematical Operations by Optical Processing," Lee, *Optical Engineering*, vol. 13, No. 3, May/June, 1974, pp. 196–207.

*Primary Examiner*—John K. Corbin
*Assistant Examiner*—John D. Lee
*Attorney, Agent, or Firm*—John R. Tresansky; Robert D. Marchant; John R. Manning

[57] ABSTRACT

The contrast produced from a photographic transparency is controlled by placing the transparency between a pair of partially reflecting mirrors forming walls of an optical cavity. Mirrors are used to trap a collimated laser beam illuminating the transparency so that at least a portion of the beam energy is passed through the transparency plural times. The distance that the light beam travels between the mirrors is controlled as a function of the wavelength of the beam energy to control the phase of light interference in the beam passing through the transparency, thereby controlling the intensity of the beam derived from the mirror downstream of the transparency. The contrast of the transparency is increased or decreased, depending upon whether constructive or destructive interference for the beam energy is provided by the mirror spacing. For a negative input transparency a low to high contrast projected negative or positive image can be obtained.

15 Claims, 2 Drawing Figures

METHOD AND APPARATUS FOR PRODUCING AN IMAGE FROM A TRANSPARENT OBJECT

ORIGIN OF THE INVENTION

The invention described herein was made in the performance of work under a NASA contract and by an employee of the United States Government and is subject to the provisions of Section 305 of the National Aeronautics and Space Act of 1958, Public Law 85-568 (72 Stat. 435; 42 U.S.C. 2457), and may be manufactured and used by or for the Government for governmental purposes without the payment of any royalties thereon or therefor.

FIELD OF THE INVENTION

The present invention relates generally to an apparatus for and method of controlling the contrast of a photographic transparent image and more particularly to controlling the image contrast by projecting a coherent beam of optical energy onto the image via an optical cavity that is adjusted to control the optical interference in the beam path.

BACKGROUND OF THE INVENTION

Five general techniques exist in the prior art to control the contrast of photographic transparencies. The five techniques are:
1. Hand dodging;
2. Unsharp markings;
3. Partially reflecting mirrors responsive to an incoherent light source;
4. Infrared quenching of a fluorescent screen excited by an ultraviolet source; and
5. A cathode ray beam with electronic feedback.

In technique (1), a small mask is moved by hand about certain areas of the transparency during a printing operation. The hand dodging method is inexact because of difficulties in manually controlling the position of the small mask on corresponding areas of the transparency. When technique (2) is utilized to make positive prints from negative transparencies, an unsharp positive mask is prepared and, during a printing operation, placed between a printing light source and the negative. While the unsharp masking method enables small areas to be controlled with greater facility than can be attained with the hand dodging method, the unsharp masking method requires an additional development step to produce the mask. Thereby, the unsharp masking method is somewhat inconvenient, since it requires a significant amount of time to implement and it is difficult to control the results.

In technique (3), the original transparency is sandwiched between a pair of partially reflecting mirrors and illuminated through one of the mirrors with a uniform, noncoherent printing light. Since the light is reflected between the mirror surfaces several times, the beam propagated through the mirror located downstream of the transparency has a greater contrast than the transparency. If, however, it is desired to reduce the contrast of the transparency, technique (3) cannot be utilized, without substituting mirrors having different reflecting and transmitting properties. Of course, physical substitution of one mirror for another is inconvenient and time consuming.

In technique (4), a transparency is placed against a fluorescent screen that is illuminated by an ultraviolet source and coated with an infrared quenching phosphor. The negative is illuminated by an infrared source simultaneously with illumination of the screen by the ultraviolet source. In response to the infrared illumination, the screen emits a blue light having a brightness controlled by the quenching action of the infrared source, as coupled through the transparency to the fluorescent screen. Since the transparency is in contact with the fluorescent screen, the transparency modulates the infrared source which in turn modulates the screen brightness. Technique (4) can be employed if it is desired to decrease the contrast of the transparency since the infrared quenching is greatest where the density of the transparency is at a minimum. For this reason, there appears on the fluorescent screen an unsharp image of a polarity type opposite to the polarity of the transparency (e.g., a negative transparency results in an unsharp positive image). Technique (4) has the further disadvantage of being able to only decrease, and not increase, the contrast of the transparency.

In technique (5), a scanning dot of a cathode ray tube illuminates a transparency on the tube face to serve as a printing light for a photographic film being exposed. Behind the film, there is located a photodetector to derive a signal proportional to the transmittance of the transparency. In response to the photodetector output signal, control circuitry for the cathode ray tube is adjusted to modulate either the brightness or the sweep speed of the scanning dot to increase or decrease the transparency contrast. By modulating the scanning dot accordingly, a mask type illumination on the cathode ray tube face, similar to an unsharp positive or negative, is produced. Hence, the only prior art device capable of providing both increased and decreased contrast of photographic transparencies includes very expensive electronic equipment. In addition, the size of the scanning dot on the face of the cathode ray tube provides an upper limit on the resolution of the image.

BRIEF DESCRIPTION OF THE INVENTION

In accordance with the present invention, an apparatus and method are provided for selectively enabling the contrast of a transparent image to be increased or decreased by projecting a beam of coherent optical energy onto the transparent image via an optical cavity, the length of which is varied as a function of the wavelength of the coherent optical energy. The optical cavity includes first and second reflecting surfaces in light exchange relationship with each other and the transparent image. The first reflecting surface is partially reflecting and partially transmitting; the second reflecting surface is also partially reflecting and partially transmitting. When the second reflecting surface is totally reflecting, the film to be exposed is also placed in the cavity and becomes part of the optical path. In this case the film to be exposed must be somewhat transparent. The coherent beam is passed through the first surface onto the transparent image so that at least a portion of the beam energy is passed through each segment of the image plural times prior to being coupled out of the cavity to an image plane. The distance that the light beam travels between the reflecting surfaces is adjusted as a function of the wavelength of the energy to control the amount of interference in the beam paths through each image segment. Thereby, if it is desired to provide increased or decreased contrast, the reflecting surfaces are adjusted so that constructive or destructive light interference occurs in the optical cavity to control the light output of the cavity for each of the points on the image. The beam is collimated as it travels through the image and is reflected by the surfaces so that the same portions of the beam always impinge on the same segment of the image.

By illuminating the image with a collimated optical beam in an optical cavity, a forward optical path and a feedback optical path are provided in the optical cavity. If the dimensions of the optical cavity are such that constructive interference exists, the feedback can be considered as positive, thereby providing increased contrast between the light and dark portions of the image. Conversely, if the separation between the mirrors is such that destructive interference exists, there is negative feedback and decreased contrast between the light and dark regions of the image.

In accordance with one embodiment of the invention, the cavity is illuminated by a collimated beam, with the cavity mirrors and the image being located in mutally parallel planes and the spacing thereof controlled by an appropriate translator, such as a piezoelectric transducer. In a second embodiment which provides spatial filtering, as well as variable image contrast (if desired), the cavity is illuminated at a point, with the cavity mirrors being tilted by opposite oblique angles relative to the plane of the image. To change the separation between the mirrors, the mirror spacing is controlled without varying the oblique tilt angle. In the second embodiment, to avoid physical contact between a transparency and the mirrors, at least one lense is provided in the optical cavity, between the mirrors and on opposite sides of the transparency. Although the above second embodiment is preferred, it should be understood that other configurations for providing spatial filtering may be used such as, for example, a parabolic mirror or mirrors may be used in the optical cavity instead of the lense or lenses.

It is, accordingly, an object of the present invention to provide a new and improved method of an apparatus for controlling the contrast obtained from a transparent image.

An additional object of the invention is to provide a new and improved method of and apparatus for increasing or decreasing the contrast obtained from a transparent image.

A further object of the invention is to provide a means for spatial filtering of a transparent image. This filtering can be done with or without the contrast control feature of the invention.

A further object of the invention is to provide a new and improved method of and apparatus for increasing or decreasing the contrast of a transparent image with a great degree of resolution and relatively inexpensive equipment.

A further object of the invention is to provide a method of and apparatus for controlling the contrast of a transparent image wherein the transparency is formed on a plane in an optical cavity and illuminated by a coherent optical beam.

The above and still further objects, features and advantages of the present invention will become apparent upon consideration of the following detailed description of several specific embodiments thereof, especially when taken in conjunction with the accompanying drawing.

DETAILED DESCRIPTION OF THE PREFERRED EMBODIMENTS

Figure 1:
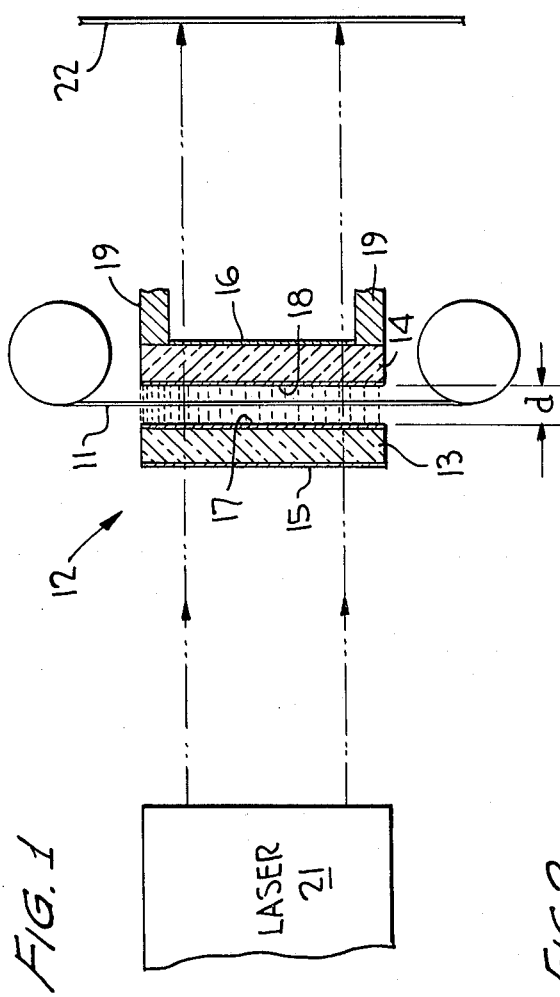
FIG. 1 is a schematic diagram of one embodiment of the invention wherein the optical cavity includes a pair of reflecting surfaces that are parallel to each other and the transparency.

Reference is now made to FIG. 1 of the drawing wherein a photographic transparency 11 is located in an optical cavity 12 including mirrors 13 and 14. Each of mirrors 13 and 14 has a glass base and respectively includes input and output planar faces 15 and 16, both of which have anti-reflecting coatings thereon. Planar faces 17 and 18 of mirrors 13 and 14, on the opposite faces of the mirrors from surfaces 15 and 16, are coated with partially reflecting and partially transmitting coatings; typically, the reflectance of faces 17 and 18 is between fifty and ninety-five percent, while the transmitivity of faces 17 and 18 is between fifty and five percent.

Planar faces 15–18 are all parallel to each other, with the spacing (d) between faces 17 and 18 being controlled by piezoelectric translators 19, mounted to bear against the top and bottom portions of face 16. Mirror 13 is maintained in situ so that the distance separating faces 17 and 18 is controlled exclusively by translators 19.

Within the optical cavity between faces 17 and 18, planar transparency 11 is mounted so that it lies in a plane parallel to faces 17 and 18. The volume between faces 17 and 18 is filled with a fluid having the same index of refraction as the transparency; the reflecting face 15 is antireflection coated. Thereby, there is no refraction of an optical beam incident at a normal angle on face 15, as the light beam is transmitted through optical cavity 12. A collimated light beam normally incident on face 15 remains collimated as it travels through the cavity.

Input face 15 of optical cavity 12 is illuminated by a collimated coherent optical beam, having a constant intensity over an area at least equal to the area of transparency 11 within cavity 12; such a coherent beam is derived from laser source 21 to uniformly illuminate the transparency the first time it passes through the transparency. The coherent light beam has a normal angle of incidence on input face 15 so that it remains collimated as it is transmitted through and reflected by optical cavity 12. Thereby, each segment of the coherent light beam always acts on the same segment of transparency 11.

The light propagated from output face 16 is projected onto a planar image face 22. Typically, planar image face 22 is a photographic film or it can be a viewing surface.

The beam emerging from output face 16 has increased or decreased contrast relative to the contrast of transparency 11, depending upon the wavelength ($\lambda$) of the beam and the separation ($d$). If the values of $\lambda$ and $d$ are such that $d = (n_1 \lambda)/4$, where $n_1 =$ an odd integer, destructive interference occurs in optical cavity 12 and the light output from each elemental area of face 16 is decreased from a reference value. In contrast, in response to $d = (n_2\lambda)/2$, where $n_2$ = any integer, there is constructive interference and the amount of light output derived from each elemental area of face 16 is increased from a reference value. Of course, the light derived from each elemental surface area of output face 16 is modulated by the density of transparency 11 for that elemental surface area. For constructive and destructive interference, increased and decreased contrast is thereby provided for the different elemental surface areas of transparency 11.

Mathematically, the contrast ($c$) of the optical energy derived from output face 16 for the surface areas of transparency 11 having the greatest and least densities is:

$$c = \frac{I_{max} - I_{min}}{I_{max} + I_{min}} \quad (1)$$

where:
$I_{max}$ = the maximum intensity of the optical energy derived from an elemental surface area of face 16;
$I_{min}$ = the minimum intensity of the optical energy derived from an elemental surface area of face 16.

The intensity ($I_{x,y}$) of the optical energy emerging from any elemental area ($x,y$) of face 16 is equal to the square of the absolute value of the transmitivity ($T_{x,y}$) of the optical energy from that elemental area ($x,y$) assuming the input amplitude of the collimated beam is unity, whereby $$I_{x,y} = |T_{x,y}|^2 \quad (2)$$

It can be shown that the transmitivity at the elemental area is:

$$T_{x,y} = \frac{t_1 t_2 A_{x,y}}{1 - r_1 r_2 \beta A_{x,y}^2} = t_1 t_2 A_{x,y} [1 + r_1 r_2 \beta A_{x,y}^2 + \ldots] \quad (3)$$

where:
$A_{x,y}$ = the amplitude transmittance of the negative at the elemental area $x,y$;
$\beta = e^{i\phi}$
$\phi = (2\pi d/\lambda)$
$d$ = mirror spacing;
$t_1, t_2$ = the amplitude transmittances of faces 17, 18, respectively;
$r_1, r_2$ = amplitude reflectances of faces 17, 18, respectively;
$i = \sqrt{-1}$; and
$\lambda$ = wavelength of the coherent optical energy Hence, Equation (3) essentially describes the effects of multiple reflections between the reflecting faces 17 and 18 on the amplitude transmittance of an elemental area of transparency 11.

In response to $\phi = \pm (\pi/2)$, $\beta = \pm i$, so $$I_{x,y} = k_1^2 |1 \pm ik_2 + \ldots|^2 \quad (4)$$
for $\phi = 0, \beta = +1$, so
$$I_{x,y} = k_1^2 (1 + k_2 + \ldots)^2 \quad (5)$$
for $\phi = \pm \pi, \beta = -1$, so
$$I_{x,y} = k_1^2 (1 - k_2 + \ldots)^2 \quad (6)$$

where
$k_1 = t_1 t_2 A_{x,y}$ and
$k_2 = r_1 r_2 A^2_{x,y}$.

The constructive and destructive interferences indicated by Equations (5) and (6) provide optical output energies that are greater and less than the reference value.

Figure 2:
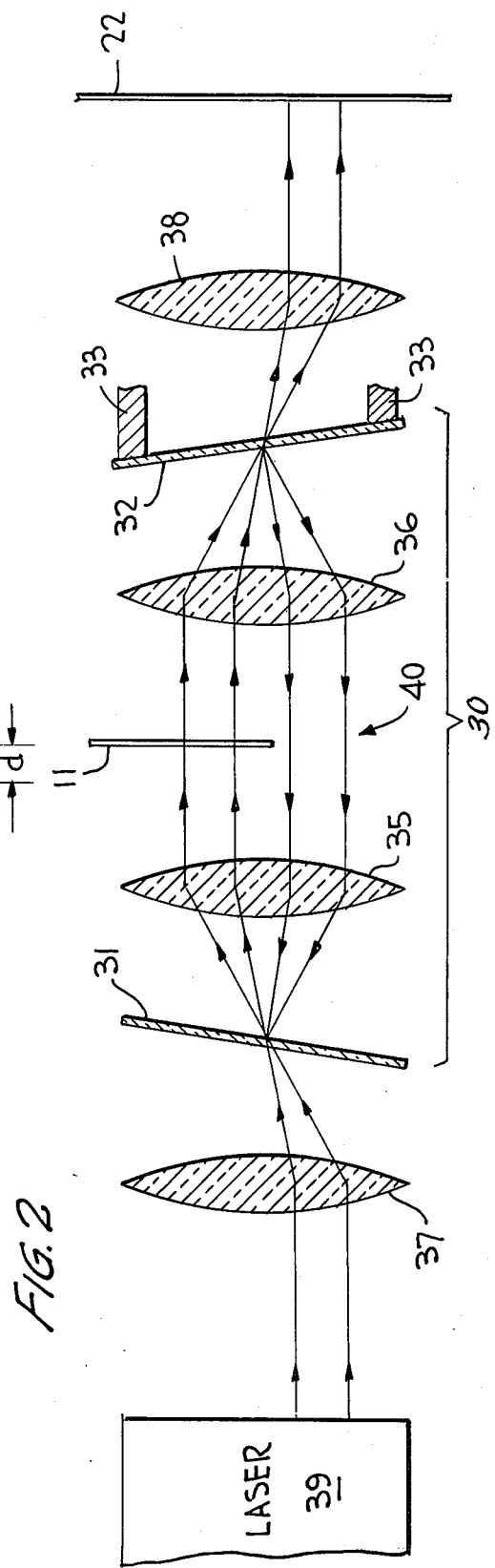
FIG. 2 is a schematic diagram of a second embodiment of the invention wherein the optical cavity includes reflecting surfaces that are at an oblique angle relative to the transparency.

The optical cavity can have many different configurations, another one of which is illustrated in FIG. 2. In FIG. 2, optical cavity 30 includes a pair of partially transmitting and partially reflecting, planar mirrors 31 and 32 which are tilted about the plane of transparency 11, so that the mirrors make equal, but opposite, oblique angles with the plane of transparency 11. The separation between mirrors 31 and 32 is controlled, without changing the tilt angle between them, by any suitable means, such as piezoelectric transducers 33 which are respectively provided at the top and bottom edges of mirror 32 to translate mirror 32 relative to the fixed position of mirror 31.

Within optical cavity 30, positioned on either side of transparency 11 and having longitudinal axes parallel to the transparency, are double convex lenses 35 and 36. Lens 35 collimates the optical energy transmitted through mirror 31 onto transparency 11, while lens 36 focuses the collimated light passing through transparency 11 onto mirror 32 as a spatially transformed image. For example, a vertical line in transparency 11 is transformed by the optical cavity into a series of horizontal lines projected onto mirror 32.

Positioned outside of optical cavity 30, are double convex lenses 37 and 38. Lens 37 is positioned to be responsive to coherent, collimated optical energy having a constant cross-sectional intensity, as derived from laser source 39. Lens 37 focuses the coherent energy to a point on the planar surface of mirror 31. Lens 38 is positioned between mirror 32 and imaging surface 22, to re-image the light beam propagated through mirror 32.

By translating mirror 32 relative to mirror 31 and the plane of transparency 11, the separation between the mirrors is changed to vary the length of optical cavity 30. As the length of optical cavity 30 is varied as a function of the wavelength of laser source 39, the amount of light internally reflected within cavity 30 is changed, due to constructive and destructive interference, to enable the contrast of image 11 to be increased and decreased, as desired. As in the FIG. 1 embodiment, corresponding segments of the optical energy pass a plurality of times through the same segment of the transparency to provide constructive or destructive optical interference.

The FIG. 2 configuration, in addition to selectively providing increased and decreased contrast, provides spatial filtering of transparency 11. Lens 36 reforms the optical energy transmitted through transparency 11 into a spectrum that is imaged on mirror 32. The spectrum from mirror 32 is projected back to mirror 31 via lens 36 and 35, without passing through transparency 11, so that there is formed on mirror 31 a spectrum of collimated image 40 that propagates from lens 36 to lens 35. Reflected light from the spectrum imaged on mirror 31 is re-imaged by lens 35 on transparency 11. Lens 38 takes a spectrum formed on mirror 32 to form an image of the spectrum on screen 22. Spatial filtering can be done on mirrors 31 or 32. Path lengths can be changed to vary the location of where the spatial filtering is done.

While there have been described and illustrated several specific embodiments of the invention, it will be clear that variations in the details of the embodiments specifically illustrated and described may be made without departing from the true spirit and scope of the invention as defined in the appended claims. For example, the transparencies of FIGS. 1 and 2 can be replaced by a photochromic film on which is projected an optical image of interest. The intensity of the image projected on the photochromic film varies the density of the film, thereby enabling different images to be formed without moving a transparency in the optical cavity. Further, selective spatial filtering of the image can be obtained by mounting an appropriate filter (such as a neutral density filter) on the input or output mirrors; preferably such filters are mounted on the output mirror and can be changed at will by providing a filter holder on the mirror, although mirrors having filters fixedly mounted thereon can be used. As an additional modification, a non-linear intensity response at the particular wavelength being used can be attained by immersing the optical cavities of FIG. 1 or 2 in a fluid forming a dye cell, whereby the fluid between faces 17 and 18 has a nonlinear intensity response at the particular wavelength being used.

What is claimed is:

1. A method of producing an image from a transparent object disposed within the path of a coherent energy beam, comprising the steps of:
focusing said beam on a partially reflective and partially transmissive surface, said surface being inclined at an oblique angle to said object and having a first surface coated with an anti-reflecting material and a second surface coated with a partially reflecting and partially transmitting material;
transmitting said beam through said surface;
collimating said trnasmitted beam;
passing said collimated beam through said object to form an image thereof;
focusing said image on another partially reflective and partially transmissive surface, said another surface being inclined opposite to and at said same oblique angle as said surface and having a first surface coated with an anti-reflecting material and a second surface coated with a partially reflecting and partially transmitting material;
reflecting said image from said another surface to said surface without passing through said object for selectively and independently filtering said reflected image;
re-reflecting said reflected image from said surface;
collimating said re-reflected image from said surface;
passing said collimated image through said object to form an enhanced image thereof;
enhancing said enhanced image plural times;
focusing said enhanced image on said another surface;
transmitting said enhanced image through said another surface; and
varying the distance between said surface and said another surface as a function of the wavelength of said beam for selectively increasing and decreasing the contrast of said enhanced image and for selectively making said enhanced image positive and negative relative to said object.

2. The method of claim 1 further including the steps of:
collimating said reflected image from said another surface; and
focusing said collimated reflected image on said surface.

3. The method of claim 1 wherein said coherent energy beam has a constant intensity over the area of said transparent object as said beam initially passes through said transparent object.

4. The method of claim 1 further including the step of spatially filtering said coherent energy beam projected onto said transparent object.

5. The method of claim 1 wherein said image is formed by projecting said reflected image from said another surface onto a photochromic film.

6. An apparatus for producing an image from a transparent object disposed within the path of a coherent energy beam, comprising:
first focusing means disposed within said beam for focusing said beam;
first surface means spaced from and in alignment with said first focusing means said surface means being partially reflective and partially transmissive, inclined at an oblique angle to said object for receiving and transmitting said focused beam and having a first surface coated with an anti-reflecting material and a second surface coated with a partially reflecting and partially transmitting material;
means for receiving and collimating said transmitted beam, said collimated beam passing through said object to form an image thereof;
second focusing means disposed within the path of said image for receiving and focusing said image;
second surface means spaced from and in alignment with said second focusing means, said means being partially reflective and partially transmissive, inclined opposite to and at the same angle as said first surface means and having a first surface coated with an anti-reflecting material and a second surface coated with a partially reflecting and partially transmitting material, said means reflecting said image to said first surface means without passing through said object for selectively and independently filtering said reflected image, wherein said reflected image is re-reflected by said first surface means through said object for enhancing said image, said image being enhanced plural times and transmitted through said second surface means; and
translator means coupled to at least one of said surface means for varying the distance between said first and second surface means as a function of the wavelength of said beam for selectively increasing and decreasing the contrast of said enhanced image and for making said enhanced image positive and negative relative to said transparent object.

7. The apparatus of claim 6 further including:
means for collimating said reflected image from said second surface means; and
means for focusing said collimated reflected image on said first surface means for re-reflecting said reflected image through said object.

8. The apparatus of claim 6 further including lens means spaced from and in alignment with said second surface means for collimating said transmitted enhanced image.

9. The apparatus of claim 6 wherein said coherent energy beam is an optical LASER beam.

10. The apparatus of claim 6 wherein said second surface on each of said first and second surface means maintains a reflectance in the range of 50% – 95% and a transmitivity in the range of 50% – 50%.

11. The apparatus of claim 6 wherein said translator means includes a piezoelectric transducer.

12. The apparatus of claim 6 further including a fluid positioned between said first and second surface means, said fluid having approximately the same index of refraction as said transparent object.

13. The apparatus of claim 13 wherein the fluid is a dye cell having a nonlinear intensity response.

14. The apparatus of claim 6 further including means for spatially filtering said coherent energy beam projected on said transparent image.

15. The apparatus of claim 6 wherein said coherent energy beam passing through said transparent object has a constant intensity over the area of said transparent object as said coherent energy beam initially passes through said transparent object.

* * * * *